United States Patent [19]
Bernardon et al.

[11] Patent Number: 5,464,337
[45] Date of Patent: Nov. 7, 1995

[54] RESIN TRANSFER MOLDING SYSTEM

[75] Inventors: Edward Bernardon, Bedford; Michael F. Foley, Cambridge, both of Mass.

[73] Assignee: The Charles Stark Draper Laboratories, Cambridge, Mass.

[21] Appl. No.: 271,561

[22] Filed: Jul. 7, 1994

Related U.S. Application Data

[63] Continuation of Ser. No. 869,384, Apr. 15, 1992, abandoned, which is a continuation-in-part of Ser. No. 675,819, Mar. 27, 1991, Pat. No. 5,151,277.

[51] Int. Cl.$^6$ .......................... B29C 70/44; B29C 70/48
[52] U.S. Cl. .................. 425/112; 264/257; 264/313; 425/129.1; 425/389; 425/394
[58] Field of Search .................... 425/112, 127, 425/128, 129.1, 388, 389, 390, 394, 405.1; 264/257, 258, 313, 314, 316, 511, 512, 571

[56] References Cited

U.S. PATENT DOCUMENTS

| | | | |
|---|---|---|---|
| 3,004,295 | 10/1961 | Bottoms et al. | 425/388 |
| 3,492,392 | 1/1970 | Kasamatsu et al. | 264/313 |
| 4,311,611 | 1/1982 | Palmer | 264/510 |
| 4,338,070 | 7/1982 | Nava | 425/112 |
| 4,657,717 | 4/1987 | Cattanach et al. | 264/102 |
| 4,770,838 | 9/1988 | Cattanach et al. | 264/316 |
| 4,808,362 | 2/1989 | Freeman | 425/417 |
| 4,942,013 | 7/1990 | Palmer et al. | 264/571 |
| 4,946,640 | 8/1990 | Nathoo | 425/DIG. 19 |
| 4,975,311 | 12/1990 | Lindgren | 425/405.1 |
| 5,013,514 | 5/1991 | Azzani et al. | 264/314 |
| 5,052,906 | 10/1991 | Seemann | 425/112 |
| 5,108,532 | 4/1992 | Thein et al. | 425/388 |
| 5,128,090 | 7/1992 | Fujii et al. | 425/112 |
| 5,129,813 | 7/1992 | Shepherd | 264/511 |
| 5,134,002 | 7/1992 | Vallier | 425/389 |
| 5,151,277 | 9/1992 | Bernardon et al. | 425/112 |
| 5,156,795 | 10/1992 | Harvey et al. | 264/316 |
| 5,192,560 | 3/1993 | Umetsu et al. | 249/155 |

*Primary Examiner*—Robert B. Davis
*Attorney, Agent, or Firm*—Iandiorio & Teska

[57] ABSTRACT

A resin transfer molding system including a sealable chamber having opposing flexible diaphragms forming an outer reconfigurable tooling surface and an inner surface surrounding a workpiece including fibrous reinforcing material to be impregnated and formed over a mold surface. There are means for impregnating the fibrous reinforcing material and means for compressing the diaphragms about the fibrous reinforcing material and for urging the compressed diaphragms and the fibrous reinforcing material contained therein over the mold surface to conform the compressed diaphragms and the fibrous reinforcing material to the contours of the mold surface.

8 Claims, 6 Drawing Sheets

PERCENTAGE OF TOTAL COST
Breakdown per Cost Element

1000 Parts/Year
1 Year Program

VACUUM + ARTICULATED FINGERS

SECTIONAL MOLD

VACUUM + PINS

VACUUM w/ PLUG ASSIST

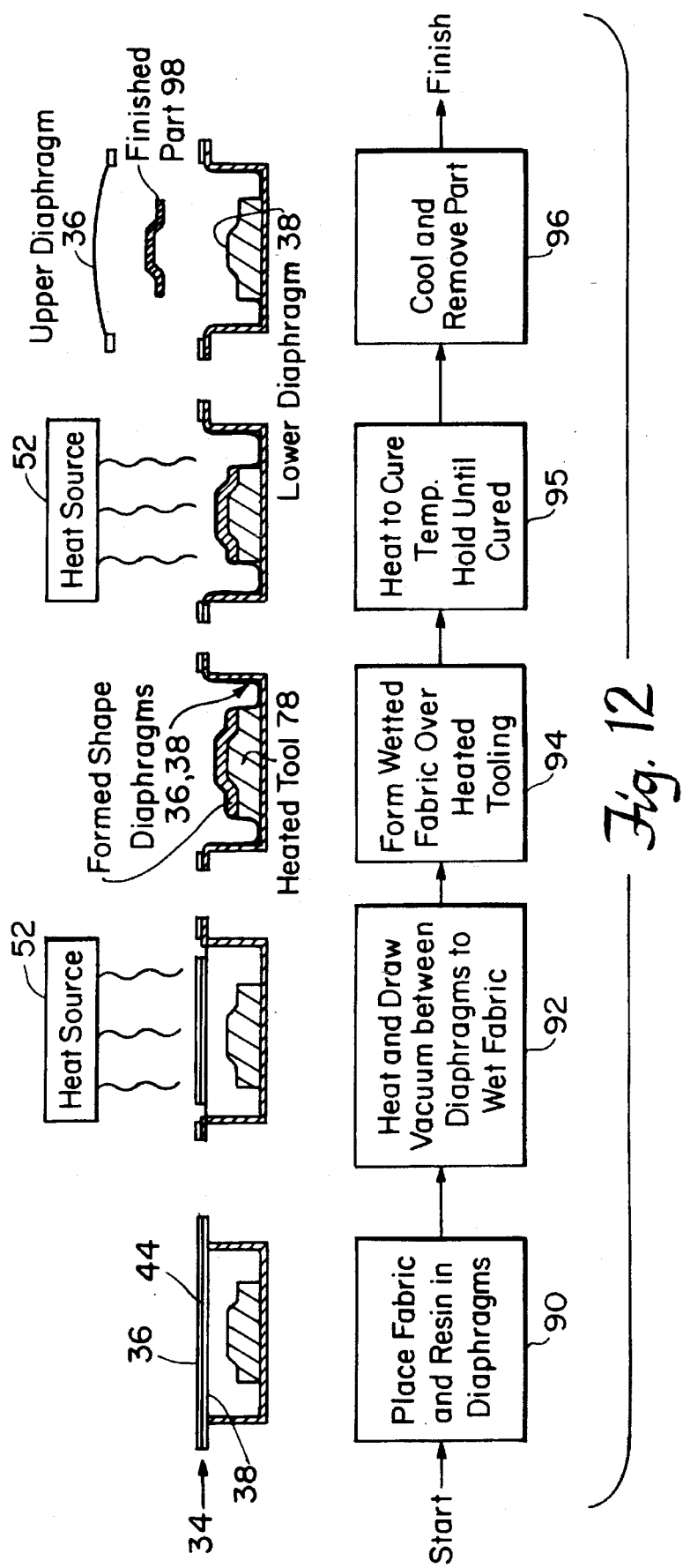
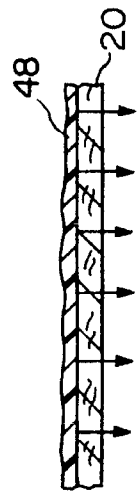

RESIN TRANSFER MOLDING SYSTEM

RELATED CASES

This is a continuation of application Ser. No. 07/869,384, filed Apr. 15, 1992, now abandoned, which is a Continuation-in-Part of U.S. Ser. No. 07/675,819, filed Mar. 27, 1991, and now U.S. Pat. No. 5,151,277, entitled "Reconfigurable Fiber-Forming Resin Transfer System" by Bernardon et al.

FIELD OF INVENTION

This invention relates to an improved resin transfer molding system and method, and more particularly to such a system and method in which fibrous reinforcing material is formed and may be impregnated while enclosed in a sealable chamber.

BACKGROUND OF INVENTION

Fiber reinforced composite parts are fabricated utilizing a variety of conventional techniques including resin transfer molding (RTM), PREPREG procedures, and preforming operations. These three techniques are discussed in turn.

RTM is a derivative of injection molding except that fluid (resin) is injected into a fibrous preform instead of an empty cavity mold. RTM, however, requires labor intensive and hence costly lay-up of the sheets of dry fiber onto a mold. After hand lay-up is completed, the mold is closed and resin is injected and allowed to cure. Another disadvantage is that uniform impregnation of the fiber workpiece is difficult to achieve. The learning curve associated with new geometries includes costly experimentation necessary to optimize processing variables and tool design to achieve void free uniform impregnation. Accordingly, complicated analysis and experimentation involving various configurations of the resin injection ports and vents is required to achieve uniform dispersion of resin through the fiber workpiece. Another problem with convention of RTM techniques is that resin gets caked on the tools, therefore, the tool surfaces must be thoroughly cleaned in order to prevent surface irregularities on successively formed parts. Still, RTM has advantages. It uses the lowest cost constitutive material possible (fiber and resin) and a high degree of geometric complexity and part integration is possible. Also, because injection pressures are relatively low, equipment costs are typically less than other methods.

Prepreg procedures involving hand lay-up of PREPREGs provide one advantage over RTM in that the problem of uniform dispersion of the resin is diminished somewhat. But, since the PREPREG must be cured in an autoclave, and since labor intensive lay-up of the fiber plies is still required, PREPREG techniques still possess many of the same inherent disadvantages. Furthermore, the PREPREG materials are expensive as compared to the raw resin and dry fiber used in RTM. Additionally, the uncured PREPREG fiber plies have certain specified shelf life and temperature limitations which add to the overall costs of manufacture. Moreover, the autoclave itself introduces additional costs as well as temperature and pressure control problems, and means are needed to prevent separation of the plies while they cure in the autoclave. Most importantly, however, PREPREG techniques add nothing over the RTM process to overcome the costly labor intensive lay-up of the plies of fiber material.

Preforming methods utilizing sizing or tackifiers partly eliminate the disadvantage of the expensive hand lay-up required in RTM and PREPREG fabrication techniques. But, as with PREPREG, there are inherent problems. Primarily, since the preform must be transferred to a conventional RTM tool for resin injection, preforming does not overcome the problem of nonuniform impregnation. Also, as with PREPREG procedure, the raw material costs are higher than the raw fiber and resin used in RTM. Finally, in conventional preforming operations, part geometry is often limited since the difficulty of maintaining preform material about the surface contours of the mold without undue wrinkling increases as the geometry becomes more complex.

One attempt to overcome the difficulty of maintaining the preform material about the contours of the mold surface utilized elastomeric sheets to prevent binding and wrinkling during the preforming process. A flat sheet of the preform material is placed between the two elastomeric sheets during forming and as the preform is shaped on the mold, the elastomeric sheets purportedly minimize fiber distortion and tears or rips in the material. Even using this technique, however, the preform must later be impregnated and all the problems of conventional RTM processes reappear. In forming hollow parts it is also known to use flexible expandable members to aid in conforming the resin injected fiber reinforced material to the interior of the hollow mold cavity. An inflatable bladder must also be used, however, and special configurations of the fiber material are required so that the material may move within the mold cavity without the need to preform the fiber material to the shape of the mold.

Therefore, these methods individually do not solve all the problems of the cost effective RTM method without introducing their own shortcomings. This is also true for other techniques such as thermoplastic automated tape layering or filament winding processes, and pultrusion. Unless a given fabrication system shows overall cost benefits to the user, it has little value as a practical innovation. Unfortunately, no known system singularly eliminates the labor intensive lay-up required by RTM and PREPREG procedures, the problems inherent in forming complex geometries, and the problem of nonuniform impregnation in fabricating a fully impregnated and formed part.

SUMMARY OF INVENTION: I

It is therefore an object of this invention to provide an improved resin transfer molding system and method.

It is a further object of this invention to provide such an improved resin transfer molding system and method which eliminates the need for labor intensive lay-up of fiber material prior to forming.

It is a further object of this invention to provide such an improved resin transfer molding system and method which is capable of forming complex geometries.

It is a further object of this invention to provide such an improved resin transfer molding system and method which achieves uniform impregnation of the fiber material without the need for complicated analysis or experimentation.

It is a further object of this invention to provide such an improved resin transfer molding system and method which is adaptable for use in many molding devices and many mold configurations.

It is a further object of this invention to provide such an improved resin transfer molding system and method which uses cost effective raw fiber material and resin.

It is a further object of this invention to provide such an improved resin transfer molding system and method which may be used to form PREPREG material as well as raw fiber and resin.

It is a further object of this invention to provide such an improved resin transfer molding system and method which singularly achieves a completely impregnated and formed fiber reinforced composite part.

It is a further object of this invention to provide such an improved resin transfer molding system and method which has the capability for easy reconfiguration.

It is a further object of this invention to provide such an improved resin transfer molding system and method in which human handling or touch labor is minimized.

It is a further object of this invention to provide such an improved resin transfer molding system and method which has the ability to form a wide variety of configurations of fiber reinforced composite parts.

It is a further object of this invention to provide such an improved resin transfer molding system and method which the fiber material can be shaped, formed, and impregnated in a one step forming process.

It is a further object of this invention to provide such an improved resin transfer molding system and method which eliminates the need to clean resin off of tooling surfaces between successive uses of the system.

This invention results from the realization that a truly improved resin transfer molding system can be accomplished by compressing the opposing sides of a sealable chamber against fiber material during or after impregnation and urging the whole assembly over the surface of a mold to form the fiber material resulting in a completely formed composite part without costly lay-up procedures; without undue analysis or experimentation regarding resin injection; and without the problems inherent in forming complex geometries. Alternatively, a workpiece with the fiber and resin already combined such a PREPREG could be used.

This invention features a resin transfer molding system in which a sealable chamber including opposing flexible diaphragms form an outer reconfigurable tooling surface and an inner surface surrounding a workpiece of fibrous reinforcing material to be impregnated and formed. There are means to impregnate the fibrous reinforcing material and means to compress the opposing diaphragms about the fibrous reinforcing material and for urging the compressed diaphragms and the fibrous reinforcing material over a mold surface to conform it to the contours of the mold surface.

The workpiece may include a quantity of resin solid at room temperature for resin infusion of the fibrous reinforcing material. The means for impregnating the fibrous reinforcing material may include means for heating the resin to lower its viscosity and to wet the fibrous reinforcing material. Alternatively, the workpiece may include fibrous reinforcing material and resin precombined as PREPREG material to be formed. Also featured are means to apply a vacuum between the diaphragms to urge the resin to flow through the fibrous reinforcing material and to assist in conforming the outer reconfigurable tooling surface about the mold surface. Positive and/or negative pressure chambers may be used to further compress the opposing flexible diaphragms about the fibrous reinforcing materials and to urge the compressed diaphragms and the fibrous material over the mold surface. The mold surface may be elevated to further tension the diaphragms about the mold surface and articulatable elements or pins may be used to tension the chamber about the workpiece.

The mold surface may be sectional or unitary male and female mold halves which may be closed about the diaphragms to compress them about the workpiece and to form the workpiece.

Air flow passages may be included in the chamber to facilitate removal of air, and a coating of non-stick material may be provided for facilitating removal of the fibrous reinforcing material once impregnation and forming are complete. Furthermore, release material such as synthetic release film may be disposed and sealed about the fibrous reinforcing material with vacuum tape to prevent the inner surface of the chamber from adhering to the material. Breather material may be disposed inside the chamber for facilitating the removal of air therein.

Also featured is a resin transfer molding method utilizing the sealable chamber described above wherein fibrous reinforcing material is placed in the chamber and impregnated. The diaphragms are then compressed about the fibrous reinforcing material and urged over a mold surface to conform the fibrous reinforcing material to the contours of the mold surface. Alternatively, fibrous material and resin are precombined as a PREPREG and placed in the sealable chamber and formed accordingly.

BRIEF DESCRIPTION OF THE DRAWINGS

Other objects, features and advantages will occur to those skilled in the art from the following description of a preferred embodiment and the accompanying drawings, in which:

FIG. 12 is a schematic process flow diagram in accordance with this invention; and FIG. 13–14 are schematic diagrams showing resin flow paths through fibrous reinforcing material.

DESCRIPTION OF PREFERRED EMBODIMENT

Figure 1:
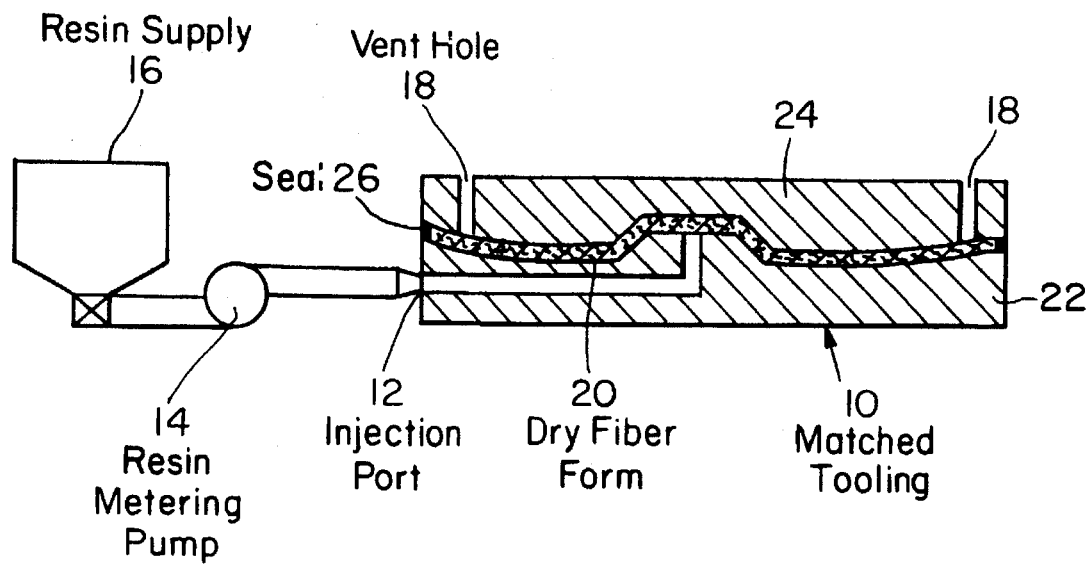
FIG. 1 is a schematic cross-sectional diagram of a prior art apparatus used in resin transfer molding processes.

A conventional resin transfer molding apparatus, FIG. 1, includes matched tooling 10, injection port 12, resin pump 14, resin supply 16 and vent hole 18. Fiber material 20 is laid up by hand on lower portion 22 of tooling 10. Upper portion 24 is then closed and sealed with lower portion 22 via seal 26; resin 16 is injected into port 12 via pump 14.

Figure 2:
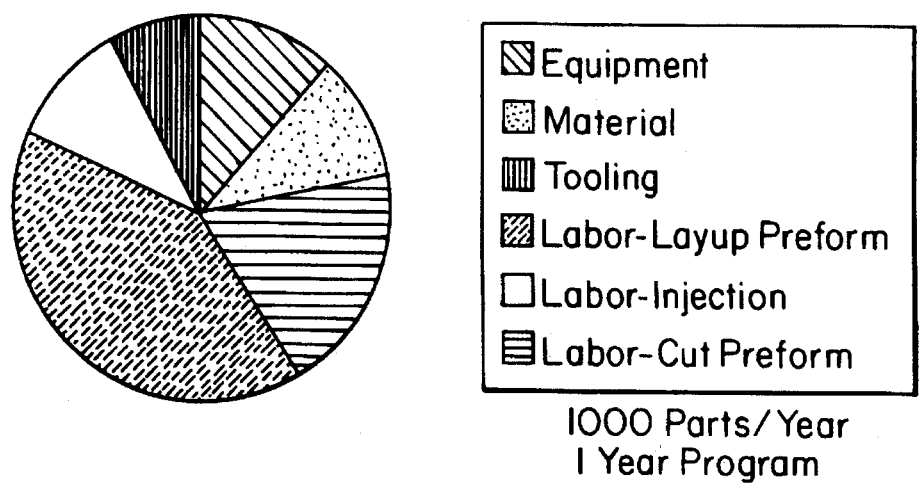
FIG. 2 is a typical cost breakdown chart for the RTM process.
Figure 3:
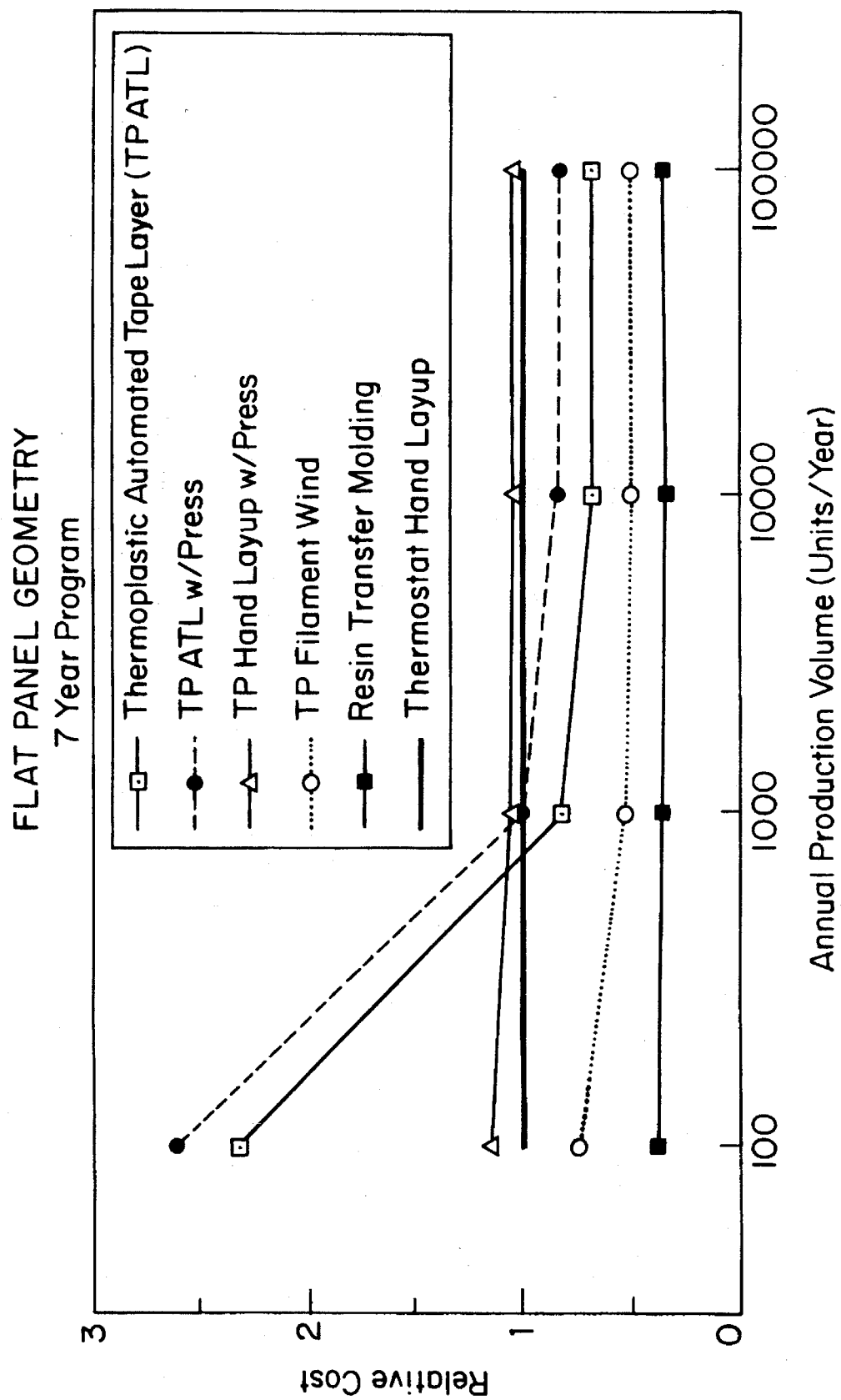
FIG. 3 is a cost versus production volume chart for various composite processes.

As shown in FIG. 2, based on an economic analysis, the labor costs involved in the lay-up, the cutting of the fiber material, and the injection constitutes a substantial percentage of the total cost. Still, cost studies have shown, FIG. 3, that RTM is the most cost effective process at all production volumes. The present invention utilizes, based on development analysis, the benefits of the traditional RTM process and at the same time lowers main cost centers associated with RTM without introducing any of its own shortcomings.

Figure 4:
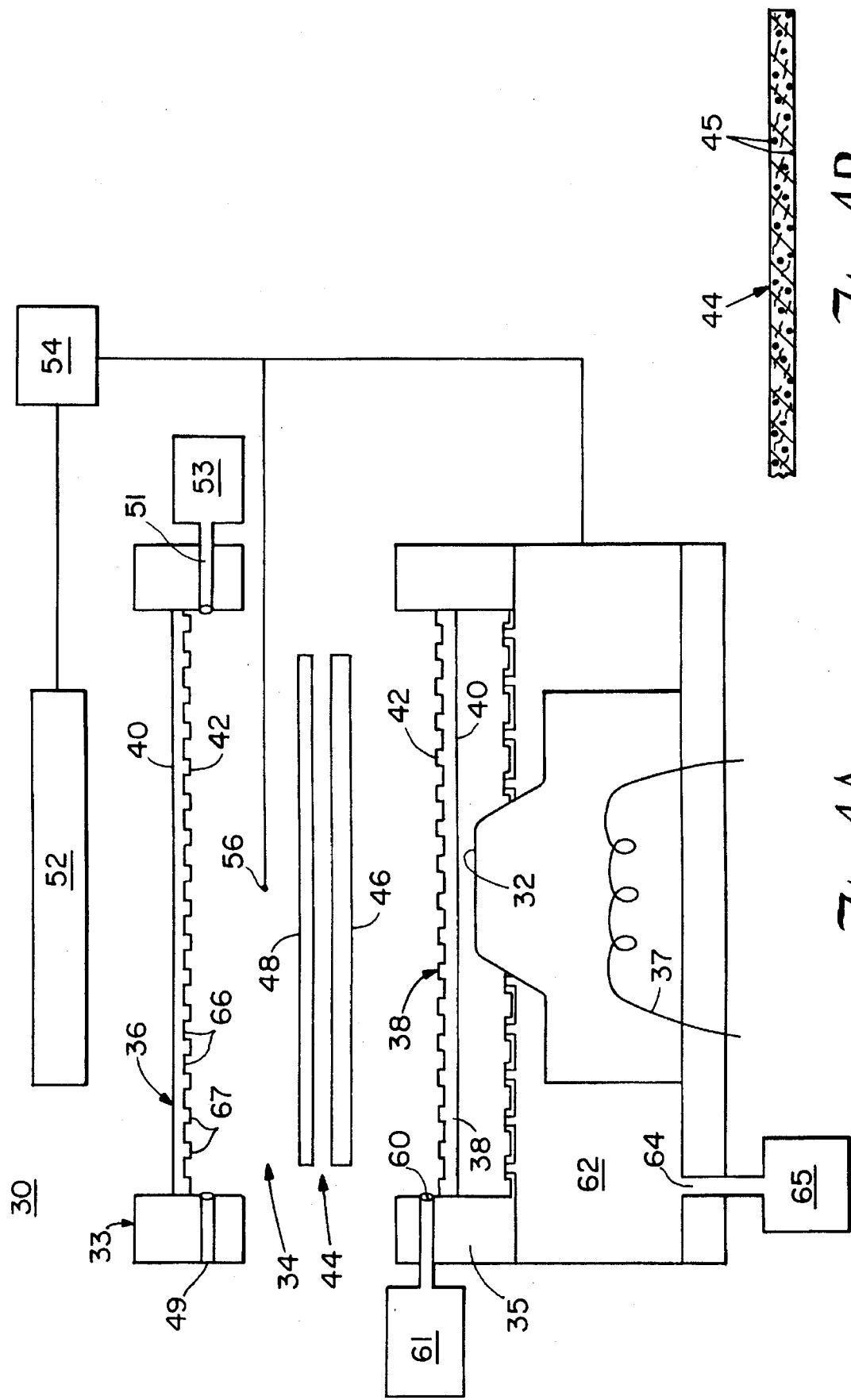
FIG. 4A is a schematic cross-sectional diagram of a resin transfer molding system according to this invention in which the workpiece includes resin and fibrous reinforcing material.
FIG. 4B shows the workpiece including PREPREG material.

The resin transfer molding system 30, FIG. 4A, includes mold surface 32, sealable chamber 34 with frames 33 and 35 holding flexible diaphragms 36 and 38, respectively, forming outer reconfigurable tooling surface 40 and inner surface 42 surrounding workpiece 44. Outer reconfigurable tooling surface 40 allows repeated forming by mold surface 32 since the diaphragms are flexible. As disclosed in the parent application, Ser. No. 575,819; U.S. Pat. No. 5,151,277, rubber or elastomeric material is preferable for the diaphragm since such material is elastically deformable and reconfigurable. Workpiece 44 includes fibrous reinforcing material 46 and in one embodiment may include a quantity of resin 48 shown in FIG. 4A as a sheet of resin solid at room temperature, or granules of resin spread about fibrous reinforcing material 46. Alternatively, workpiece 44, FIG. 4B, may include fibrous reinforcing material and resin 45 pre-combined in the form of a conventional PREPREG. In that case, of course, the fibrous reinforcing material will be pre-impregnated. In the case where a resin sheet is used, resin sheet 48, once heated, will melt and flow transversely through the thickness of fibrous reinforcing material 46. This through the thickness impregnation capability is a further advantage of the structure of the present invention. Since the resin does not need to flow completely across the whole fiber bed, impregnation is more uniform. In conventional RTM systems, resin 16, FIG. 1, must flow through port 12 and through fiber material 20 as shown in FIG. 13. When a sheet of resin 48, FIG. 14, solid at room temperature is disposed above fiber material 20, in accordance with this invention, and then heated to above its melt point, the resin need only flow through the thickness of the fiber material 20 as shown. Resin such as Dow Taxtrix 742 or 3M PR 500 resin may be used.

Alternatively, port 49, FIG. 4A, may be used to inject resin in chamber 34 to impregnate fibrous reinforcing material 46. Resin will flow across the fibrous reinforcing material 46 and may be assisted by a vacuum port 51 connected to vacuum source 53. Vacuum port 60 may be used to compress opposing diaphragms 36 and 38 about the fiber reinforcing material 46 by connecting a vacuum source 61 to port 60. A vacuum drawn within chamber 34 also facilitates impregnation of fibrous reinforcing material 46 by resin 48 once resin 48 is heated above its flow point by drawing resin 48 transversely through the thickness dimension of material 46.

Heat source 52, disposed proximate diaphragms 36 and 38 may be used to wet fibrous reinforcing material 46 with resin 48. As source 52 warms resin 48, the viscosity of resin 48 will be lowered and it will flow through and impregnate fibrous reinforcing material 46.

Mold surface 32 may be heated by heater 37 as is shown in FIG. 4A to aid in curing resin 48 once fibrous reinforcing material 46 is impregnated, diaphragms 36 and 38 are compressed about fibrous reinforcing material 46, and the compressed diaphragms 36 and 38 and the fibrous reinforcing material 46 are drawn over mold surface 32. Additionally, control system 54 may be incorporated for controlling the temperature of heat source 52 and mold surface 32 in relation to the temperature inside chamber 34 monitored by sensor 56 for quality control purposes.

Pressure chamber 62 may provide means for compressing opposing flexible diaphragms 36 and 38 about fibrous reinforcing material 44 and for urging the compressed diaphragms and the fibrous reinforcing material over mold surface 32. Vacuum port 64 may be connected to vacuum source 65 in order to draw vacuum in chamber 62 for this purpose. Pressure chamber 62 also provides the force which urges resin 48, once heated by heat source 52, to flow through fibrous reinforcing material 44.

In a preferred embodiment, inner surfaces 42 of flexible diaphragms 36 and 38 may have air flow passages 66 formed between lands 67, for facilitating removal of air from chamber 34.

Figure 5:
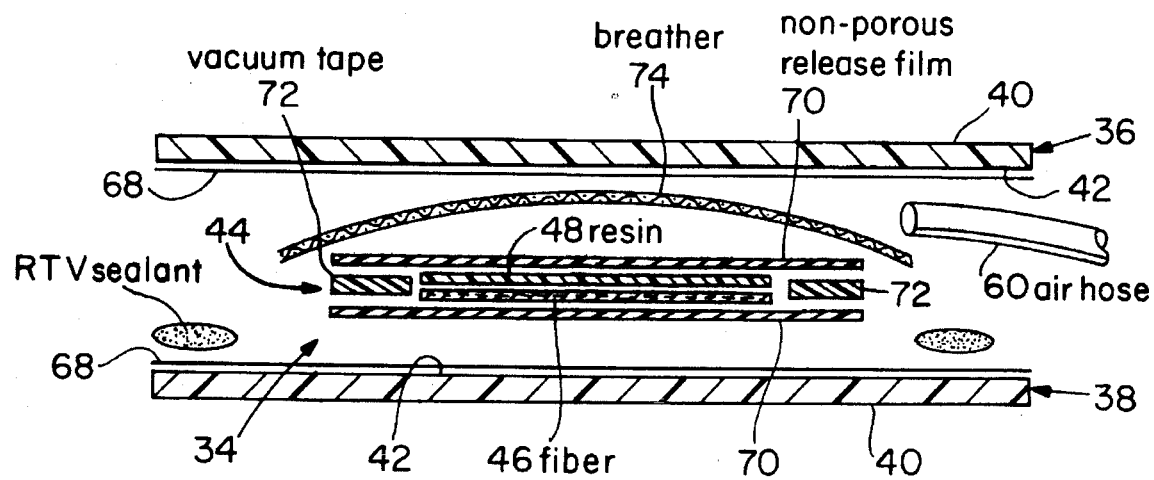
FIG. 5 is a schematic cross-sectional view of another embodiment of a sealable chamber according to this invention.

Further, Workpiece 44, FIG. 5, may include release material 70 such as a release film disposed about fibrous reinforcing material 46 for preventing inner surface 42 from adhering to the fibrous reinforcing material 46. Vacuum tape 72 may be incorporated to seal release film 70 about fibrous reinforcing material 46. Workpiece 44 may also include breather material 74 for facilitating removal of air from within sealable chamber 34. Also, a coating of non-stick material 68 such as teflon may be included for facilitating removal of fibrous reinforcing material 46 from sealable chamber 34 once forming is complete.

Figure 6:
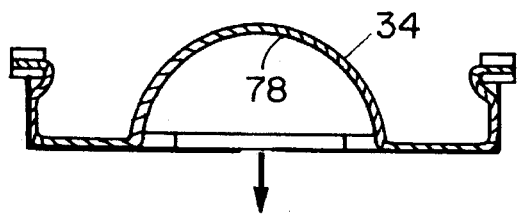
FIGS. 6–11 are schematic diagrams of different embodiments of devices which may be used to draw the diaphragms of FIGS. 4A and 5 over mold surfaces to form the fiber material in accordance with the present invention.
Figure 7:
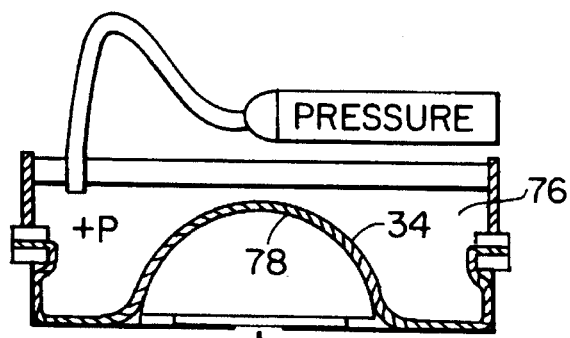

Opposing flexible diaphragms 36 and 38 may be compressed about fibrous reinforcing material 46 and urged over a mold surface by a variety of techniques. For example, as already discussed, a vacuum may be applied to sealable chamber 34 as is shown in FIG. 6 to urge chamber 34 over mold surface 78. Also, pressure chamber 76, FIG. 7, may be incorporated to further compress the diaphragms about the fibrous reinforcing material and to urge the sealable chamber 34 over the mold surface 78. Since flexible diaphragms 36 and 38 form outer reconfigurable tooling surface 40, this process is easily repeated for many manufacturing runs which may include different configurations of mold surfaces or molding devices.

Figure 10:
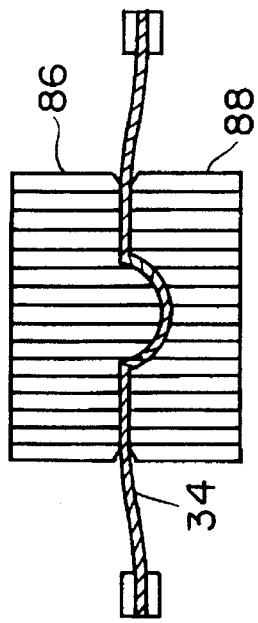
Figure 8:
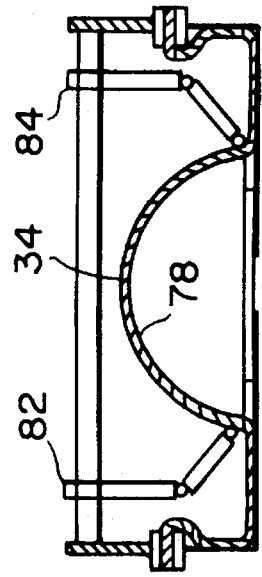
Figure 9:
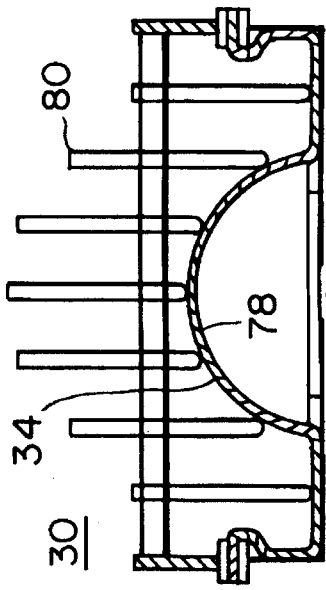

It may also be desirable to tension the diaphragms about the mold surface to prevent any binding or buckling. Accordingly, pins 80, FIG. 8, may be used with system 30, or articulatable elements 82 and 84, FIG. 10, may be used to tension sealable chamber 34 over mold surface 78. Finally, there may be means to elevate mold surface 78 as shown in FIG. 9 to assure chamber 34 fully conforms to the contours of mold surface 78.

Figure 11:
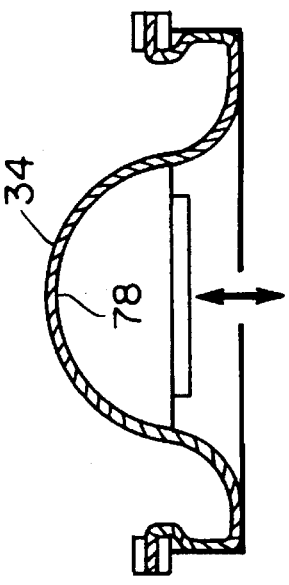

Another method of urging sealable chamber 34 over the contours of a mold surface to form the fibrous reinforcing material is shown in FIG. 11 wherein male and female mold halves 86 and 88 close about sealable chamber 34 to form the desired geometry part. Mold halves 86 and 88 may be unitary or sectional as shown in FIG. 11.

A resin transfer molding method utilizing molding system 30, FIG. 4A, is shown in FIG. 12. First, step 90, a workpiece 44 including fibrous reinforcing material and resin is placed in sealable chamber 34 comprising flexible diaphragms 36 and 38. The fibrous reinforcing material is then impregnated, step 92, by heating, via heat source 52, the resin which causes the resin to flow wetting the fibrous reinforcing material. As delineated in reference to FIG. 5, a vacuum may also be drawn within chamber 34 to further facilitate impregnation of the fibrous reinforcing material and to compress the diaphragms about the fibrous reinforcing material. Diaphragms 36 and 38 are then urged over mold surface 78 which may be heated, step 94, to form the wetted fibrous reinforcing material to the desired geometric shape. The assembly is then held in this position and heated by heat source 52 to cure the resin, step 95. Finally, after cooling, step 96, upper diaphragm 36 is separated from lower diaphragm 38 and the finished part 98 is removed. Since impregnation and forming of the fibrous reinforcing material all occurs within sealable chamber 34, mold surface 78 and any other associated tooling is not contaminated by resin.

Also, the process is easily automated if desired since each task is reduced to a separate step.

In this way, resin transfer molding system 30, FIG. 4A, accomplishes resin transfer and molding of composite parts without costly and labor intensive hand lay-up of the fibrous reinforcing material, without undue analysis or experimentation regarding resin injection, and without any of the problems inherent in forming complex geometry. Hand lay-up of the fibers is not required because the fibrous reinforcing material is formed between flexible diaphragms 36 and 38, and uniform impregnation may be easily accomplished by a number of techniques. Molding system 30 is reconfigurable because the flexible diaphragms 36 and 38 allow for many different geometry parts to be formed utilizing many different forming techniques.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A resin transfer molding system comprising:

a mold surface;

a sealable chamber including opposing elastically deformable and reconfigurable diaphragms forming an outer flexible tooling surface to be formed by said mold surface;

a workpiece including resin and fibrous reinforcing material to be impregnated and formed located between said diaphragms;

means for sealing said diaphragms about said work piece;

means for impregnating said fibrous reinforcing material with said resin while it is between said diaphragms; and means for forming said workpiece while it is between said diaphragms including means for urging said opposing diaphragms and said workpiece contained therein over the mold surface and for conforming the diaphragms and the workpiece to the contours of the mold surface.

2. The resin transfer molding system of claim 1 in which said means for impregnating includes means for wetting said fibrous reinforcing material with said resin.

3. The resin transfer molding system of claim 2 in which said means for wetting said fibrous reinforcing material includes means for heating said resin to lower its viscosity without curing and means for driving said resin through said fibrous reinforcing material.

4. The resin transfer molding system of claim 3 in which said means for heating includes a heat source disposed proximate said flexible diaphragms.

5. The resin transfer molding system of claim 4 in which said means for driving said resin through said fibrous reinforcing material includes means for applying a vacuum between said diaphragms to urge the resin to flow through said fibrous reinforcing material.

6. A resin transfer molding system comprising:

a mold surface;

a sealable chamber including opposing elastically deformable and reconfigurable diaphragms forming an outer flexible tooling surface to be formed by said mold surface;

a workpiece including fibrous reinforcing material to be impregnated and formed located between said diaphragms;

means for sealing said diaphragms about said work piece;

means for impregnating said fibrous reinforcing material while it is between said diaphragms; and means for forming said workpiece while it is between said diaphragms including means for urging said opposing diaphragms and said workpiece contained therein over the mold surface and for conforming the diaphragms and the workpiece to the contours of the mold surface, said means for forming including a pressure chamber in communication with said outer tooling surface for collapsing said opposing flexible diaphragms about said fibrous reinforcing material and for urging said compressed diaphragms and the fibrous reinforcing material over the mold surface.

7. A molding system comprising:

a mold surface;

a sealable chamber including opposing elastically deformable and reconfigurable diaphragms forming an outer flexible tooling surface to be formed by said mold surface;

a workpiece including fibrous reinforcing material and resin pre-combined as a pre-preg material to be formed located between said diaphragms;

means for sealing said diaphragms about said work piece; and means for forming said workpiece while it is between said diaphragms including means for urging said opposing diaphragms and said workpiece contained therein over the mold surface and for conforming the diaphragms and the workpiece to the contours of the mold surface.

8. A molding apparatus comprising:

a sealable chamber including opposing elastically deformable and reconfigurable diaphragms for containing a pre-preg workpiece therebetween forming an outer flexible tooling surface about said workpiece for forming the workpiece, each diaphragm stretched in a frame;

means for sealing said diaphragms with respect to each other;

means for urging said diaphragms over a mold surface conforming said outer tooling surface and a workpiece contained therein to the mold surface to shape the workpiece, said means for urging including means for driving a mold up into said diaphragms.

* * * * *